United States Patent [19]

Aso et al.

[11] Patent Number: 5,023,420
[45] Date of Patent: Jun. 11, 1991

[54] WIRE TENSION CONTROLLING METHOD IN A WIRE CUT ELECTRIC DISCHARGE MACHINE

[75] Inventors: Toshiyuki Aso; Yasuo Arakawa, both of Oshino; Junichi Kato, Komae, all of Japan

[73] Assignee: Fanuc Ltd., Minamitsuru, Japan

[21] Appl. No.: 474,754

[22] PCT Filed: Jul. 5, 1989

[86] PCT No.: PCT/JP89/00681
§ 371 Date: Mar. 23, 1990
§ 102(e) Date: Mar. 23, 1990

[87] PCT Pub. No.: WO90/00950
PCT Pub. Date: Feb. 8, 1990

[30] Foreign Application Priority Data

Jul. 28, 1988 [JP] Japan .................. 63-186890

[51] Int. Cl.$^5$ .......................... B23H 7/10; B23H 7/20
[52] U.S. Cl. ................. 219/69.12; 219/69.17; 364/474.04
[58] Field of Search ............... 219/69.12, 69.13, 69.17, 219/69.19, 69.20; 364/474.04

[56] References Cited

FOREIGN PATENT DOCUMENTS

| 59-55628 | 4/1984 | Japan . |
| 59-175926 | 10/1984 | Japan . |
| 60-8166 | 1/1985 | Japan . |
| 232830 | 11/1985 | Japan .................. 219/69.12 |

Primary Examiner—Geoffrey S. Evans
Attorney, Agent, or Firm—Staas & Halsey

[57] ABSTRACT

A wire tension controlling method in a wire cut electric discharge machine, capable of preventing occurrence of an excessive variation in a wire tension which may be caused by an abnormal operation of an electromagnetic powder brake upon start and release of application of the wire tension, and upon change of same. When the presence of a possibility of an actual wire tension being excessively changed is determined on the basis of the result of comparison between a present instructed wire tension and a new wire tension, a process of adding or subtracting an upper limit variation amount, set beforehand to such a value which may not cause the excessive variation in the wire tension, to or from the present target wire tension is repeatedly effected at predetermined intervals of a cycle until the target wire tension reaches the instructed wire tension, so that the electromagnetic powder brake effects a braking operation at an operation voltage corresponding to gradually changing target wire tension, so that the actual wire tension is gradually changed to the instructed wire tension.

8 Claims, 3 Drawing Sheets

WIRE TENSION CONTROLLING METHOD IN A WIRE CUT ELECTRIC DISCHARGE MACHINE

TECHNICAL FIELD

1. Background of the Invention

The present invention relates to a wire cut electric discharge machine adapted to control the wire tension by means of an electric bracke, and more particularly, to a wire tension controlling method capable of preventing occurrences of wire breakage at the time of starting and releasing application of the wire tension, and changing the same.

2. Background Art

In general, a wire cut electric discharge machine includes an apparatus for controlling the tension applied to a wire electrode (hereinafter referred to as a wire). Typically, the wire tension controlling apparatus includes an electromagnetic powder brake for applying a braking force to a braking roller arranged in contact with the wire. An operation voltage of the powder brake is changed to adjust the braking force applied to the braking roller, to thereby control the wire tension. However, according to the wire tension controlling apparatus of this type, there is a possibility of the wire being broken or disconnected upon start of the application of the wire tension and upon increase of the wire tension. Further, the wire may be slacked when the application of the wire tension is released and the wire tension is reduced, so that occurrence of the wire breakage may be erroneously detected by a wire breakage detection apparatus disposed in the vicinity of the wire path. In addition, there is a possibility that the wire may vibrate upon start and release of application of the wire tension, and upon increase and decrease of the wire tansion, badly influencing various operating sections of the electric discharge machine.

SUMMARY OF THE INVENTION

An object of the present invention is to provide a wire tension controlling method capable of controlling a wire tension, and of preventing wire breakage, an erroneous determination in wire breakage detection, and vibration of a wire, which may occur upon start and release of application of the wire tension and upon change of the wire tension in a wire cut electric discharge machine.

In order to achieve the above object, a wire tension controlling method of the present invention, which is applied to a wire cut electric discharge machine adapted to control a wire tension applied to a wire electrode by means of an electric brake, comprises steps of: (a) predictively determining, when a wire tension setting/updating instruction is delivered, presence/absence of a possibility of an actual wire tension being excessively changed if the electric brake is operated in accordance with the instruction; (b) changing a target wire tension by a predetermined amount so as to prevent an excessive change of the actual wire tension when the presence of the posibility of the actual wire tension being excessively changed is determined; and (c) periodically effecting the step (b) until the target wire tension reaches an instructed wire tension.

As described above, according to the present invention, when there is a possibility of the actual wire tension being excessively changed if the electric brake is operated in accordance with the wire tension setting/updating instruction, the target wire tension is gradually changed until it reaches the instructed wire tension. Therefore, the wire tension can be controlled to the target value, during an abnormal operation of the electric brake at the time of setting/updating the wire tension without the operation of the electric discharge machine being interrupted, which abnormality causes an excessive change of the wire tension which may incur wire breakage, erroneous determination of wire breakage detection, and vibration of the wire.

DESCRIPTION OF THE PREFERRED EMBODIMENTS

First, the cause of occurrence of the aforesaid problems such as wire breakage in the conventional wire tension control with the use of the electromagnetic powder brake will be explained on the basis of the knowledge of the inventors.

It is considered that the above problems may be caused by an excessive variation in the actual wire tension as the result of an abnormal operation in which a braking force generated by the powder brake will excessively overshoot or undershoot the target value when the wire tension is set/updated. That is, in the conventional wire tension control using a numerical control unit for effecting a series of various control operations at predetermined intervals of a cycle, an instructed wire tension is read from the numerical control program by the numerical control unit upon start of application of the wire tension, for instance. Then, a control signal for generating the instructed wire tension is supplied from the numerical control unit to the electromagnetic powder brake. In response to the instructed wire tension, the operation voltage of the powder brake rapidly increases within a short time period, corresponding to one control cycle, 8 msec or 16 msec, for instance, of the numerical control unit, and varies depending upon the response characteristic of the powder brake.

Figure 3:
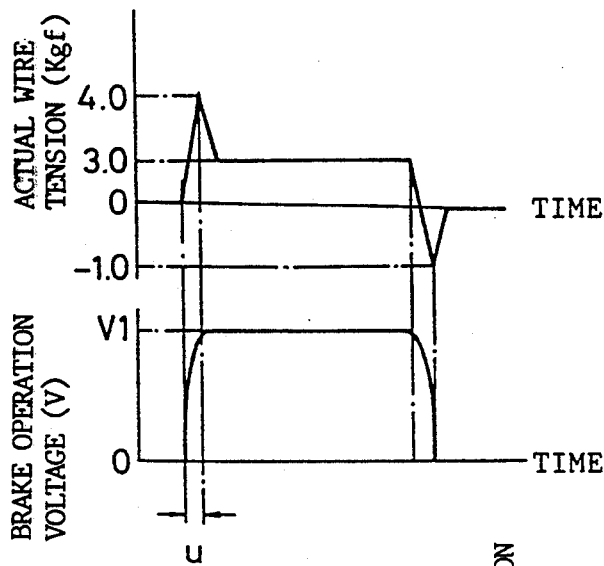
FIG. 3 is a graph showing changes of an operation voltage of an electromagnetic powder brake and of an actual wire tension with lapse of time in a conventional wire tension setting/updating operation.

Specifically, upon start of the application of the wire tension, the electromagnetic powder brake is temporarily locked, if the operation voltage of the electromagnetic powder brake rapidly increases from 0V, corresponding to the target wire tension of 0.0 kgf set for a state where no wire tension is applied, to a voltage of V1, corresponding to the target wire tension of 3.0 kfg set for applying the wire tension, within one control cycle u(=16 msec) of the numerical control unit, as shown on the left half portion in FIG. 3, for example.

As a result, the actual wire tension rapidly increases to temporarily overshoot up to a value of 4.0 kgf which is larger than the target value 3.0 kfg, so that some types of wire would break. On the other hand, when the operation voltage of the electromagnetic powder brake is rapidly reduced from a voltage of V1 to 0 V, with a change of the target wire tension from 3.0 kgf to 0.0 kgf, as shown on the right half portion of FIG. 3, the powder brake is rapidly set into the release operation state, thereby causing the actual wire tension to be rapidly reduced and significantly undershoot the target value. As a result, the wire is temporarily slacked, so that occurrence of the wire breakage may be erroneously detected by the breakage detection apparatus despite the wire not actually being broken.

Such an abnormal condition tends to more frequently occur as the target variation rate (the target variation amount per unit time) of the wire tension becomes larger. In the case of FIG. 3, the above abnormal condition seldom occurs when the target variation amount of the wire tension per one control cycle of 16 msec is less that about 2.0 kfg, but may frequently occur when it becomes about 3.0 kgf.

Figure 1:
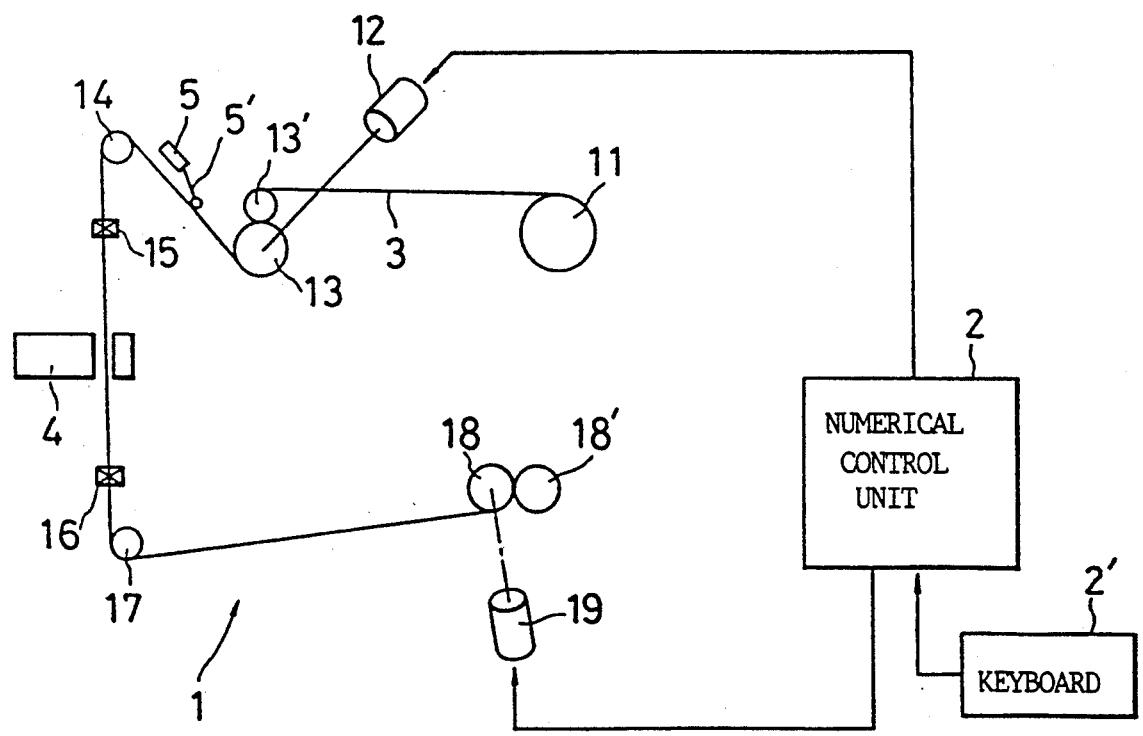
FIG. 1 is a schematic view showing a wire delivery apparatus of a wire cut electric discharge machine to which a wire tension controlling method according to an embodiment of the present invention is applied, and peripheral equipment of the wire delivery apparatus.

Referring to FIG. 1, a wire cut electric discharge machine to which a wire tension controlling method according to an embodiment of the present invention is applied includes a wire delivery mechanism 1 and a numerical control unit 2 which accommodates therein a computer connected to a keyboard 2'. The numerical control unit 2 is connected in control relation to the wire delivery mechanism 1, a table driving mechanism (not shown) for moving, relative to a wire 3, a working table (not shown) on which a work 4 is disposed, and various operating sections of the electric discharge machine including a breaking detection apparatus 5. The breakage detection apparatus 5 is arranged in a facing relation to a wire delivery path, and has a detection lever 5' thereof which is operable when the wire 3 is slacked upon wire breakage, to thereby detect occurrence of the breakage of the wire.

In the wire delivery mechanism 1, the wire 3 delivery from a wire supply reel 11 is fed to a feed roller 18 for applying a tractive force to the wire 3 to drive the wire, via a brake roller 13 cooperating with an electric brake 12 to apply a brake force to the wire 3, an upper guide roller 14, an upper guide 15, a lower guide 16 and a lower guide roller 17. The roller 18 is operatively coupled to a motor 19 which is connected to the numerical control unit 2. Reference numerals 13' and 18' respectively denote pinch rollers, which are arranged to be in urged contact with the brake roller 13 and feed roller 18, respectively.

For instance, the electric brake 12 consists of an electromagnetic powder brake, which has an electromagnetic coil connected to an external driving circuit (not shown) which is operable under control of the numerical control unit 2, and a rotary shaft disposed in a housing which is filled with ferromagnetic particles. This powder brake is so arranged that coupling forces between the ferromagnetic particles, i.e., a resultant friction force, varies depending upon a voltage applied from the driving circuit to the electromagnetic coil, i.e., a brake operating voltage (or operating power or operating current), so as to change a braking force applied to a brake roller 13 having a rotary shaft connected to the rotary shaft of the electromagnetic powder brake 12, i.e., the tension applied to the wire 3.

Now, the wire tension controlling operation of the electric discharge machine with the above construction, in particular will be explained.

Before starting the electric discharge machining operation by the electric discharge machine, in order to prevent occurrences of the above problems such as the wire breakage caused by an excessively increased or decreased variation in the actual wire tension, an operator sets an upper limit value $\Delta t$ ($>0$) of the variation rate of the target wire tension (the variation amount per one control operation cycle of the numerical control unit 2) by the use of the keyboard 2'. This upper limit variation rate $\alpha t$ is set to a value enough to prevent an occurrence of an excessive variation in the actual wire tension even when the target wire tension increases or decreases at the upper limit variation rate, which excessive variation may cause breakage of the wire 3, an erroneous determination by the breakage detection apparatus 5, and vibration of the wire badly infuencing various operating sections of the electric discharge machine. Further, since the upper limit variation rate $\Delta t$ may vary depending upon the type of the electric discharge machine, the type of the wire 3, etc., this variation rate is experimentally decided beforehand, for instance. In addition, the upper limit value $\Delta t$ is set again where required before electric discharge machine is restarted after completion of automatic wire extension, etc.

When the upper limit variation rate $\Delta t$ of the target wire tension is set, a central processing unit (hereinafter referred to as CPU) of the computer (not shown) provided in the numerical control unit 2 causes a first register accommodated therein to store the upper limit variation rate $\Delta t$.

Figure 2:
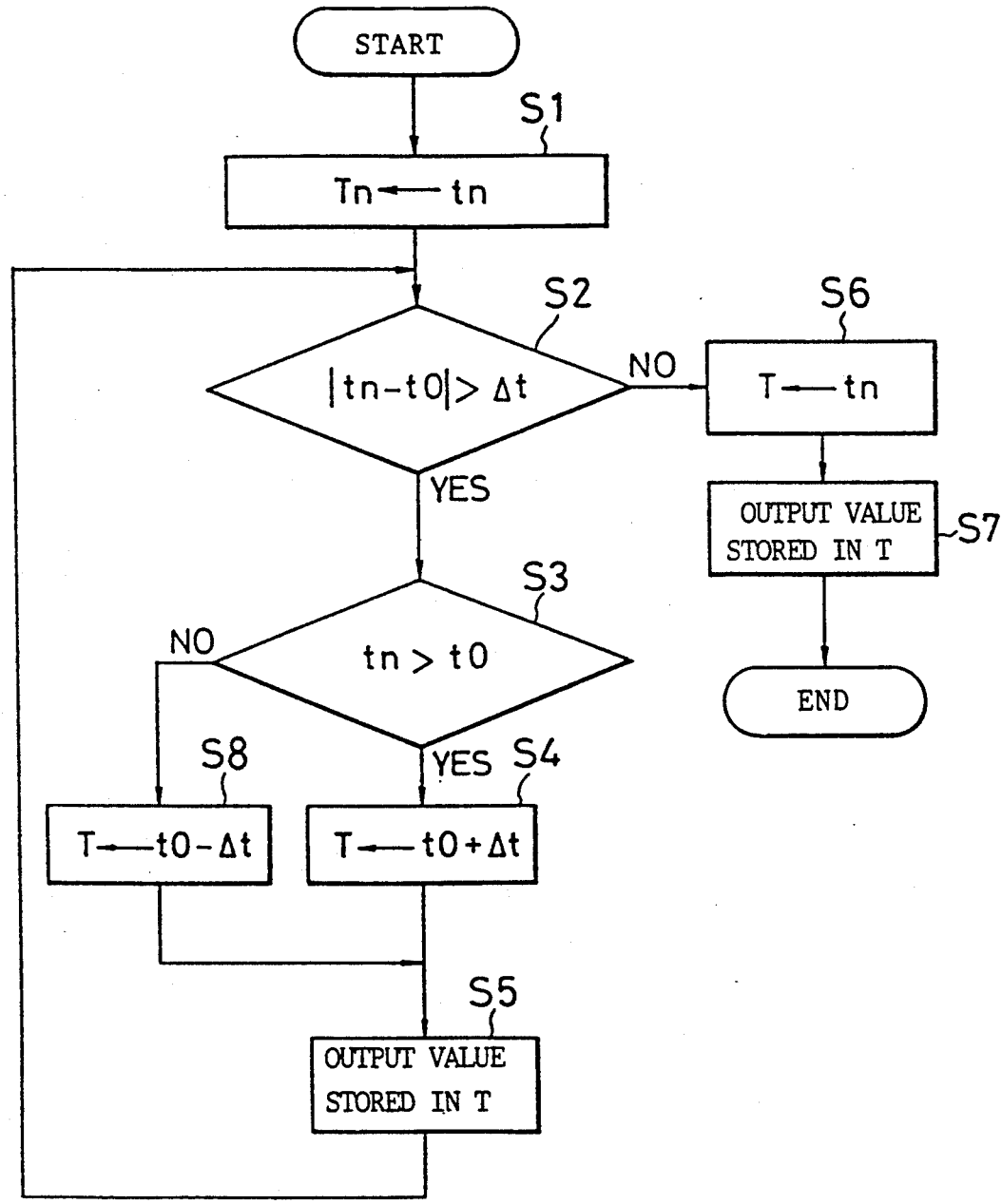
FIG. 2 is a flowchart showing wire tension setting-/updating process executed by the electric discharge machine of FIG. 1.

Before starting the electric discharge machining operation or during the same operation, the CPU executes the wire tension setting/updating process of FIG. 2 at predetermined intervals of a cycle. Meanwhile, after the start of the electric discharge machining, the CPU repeatedly effects, at the aforesaid intervals, a series of control operations, including a control operation associated with the wire delivery operation by the motor 19 via the feed roller 18, a working table positioning control operation, etc., so as to control the various operating sections of the electric discharge machine in a conventional manner.

In the wire tension setting/updating process, the CPU determines whether or not the instructed wire tension is initialized or updated through a manual operation of the operator by the use of the keyboard 2' or through the NC program (hereinafter, the operation of initializing or updating the instructed wire tension is referred to as the operation of updating the instructed wire tension). If no updating operating of the instructed wire tension is effected, the CPU supplies the driving circuit with a control signal, corresponding to a value indicative of the present instructed (target) wire tension t0 (t0=0 when no wire tension is applied) and stored in a second register T, so as to cause the driving circuit to apply a desired voltage to the electromagnetic coil of the electromagnetic powder brake 12, thereby controlling the actual wire tension to the target value t0.

When it is determined that the instructed wire tension is updated, the CPU sets a new instructed wire tension tn into a third register Tn (step S1), and compares the new instructed wire tension tn with the present target wire tension t0, to determine whether or not the absolute value of the difference therebetween (variation amount in the instructed wire tension per one control operation cycle, i.e., the instructed variation rate) is larger than the upper limit variation rate Δt of the target wire tension (step S2). If the instructed variation rate is larger than the upper limited value Δt, then it is determined whether or not the new instructed value tn is larger than the present target value t0 (step S3). If the value tn is larger than the value t0, that is, if its is predictively determined that there is a possibility that the actual wire tension may excessively increase when the new instructed value is immediately used as the new target value, the total sum of the present target value t0 and the upper limit variation ratge Δt is stored into the second register T as a new target value (step S4), and then a control signal corresponding to the total sum (t0+Δt) stored in the second register T is supplied to the electromagnetic powder brake 12 (step S5). Next, the step S2 is entered, and then the steps S2 to S5 are repeatedly executed.

Figure 5:
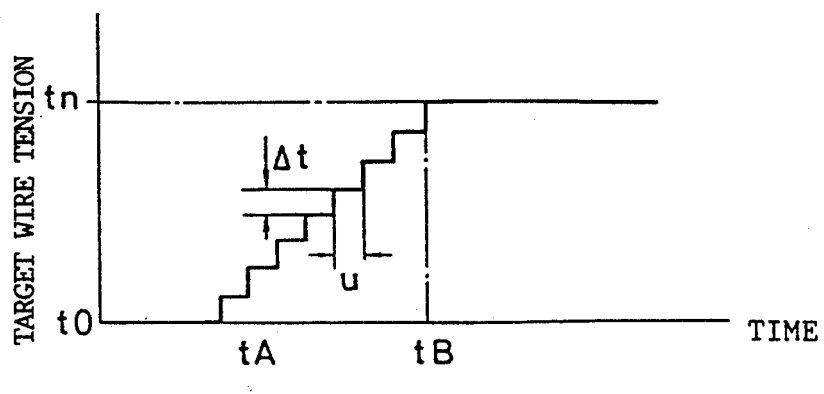
FIG. 5 is a graph showing a change of the target wire tension with lapse of time during the process of FIG. 2.

As a result, as shown in FIG. 5, the target wire tension t0 increases from the value t0, obtained before the time point tA at which the updating operation starts, towards the instructed value tn by the upper limit value Δt each time the wire tension updating process of FIG. 2 is effected. Then, in the step S2 of the processing cycle corresponding to the time point tB at which the updating process is completed, the CPU dertermines that the absolute value of the difference between the instructed value tn and the present target wire tension t0 is not larger than the value Δt, and sets the instructed value tn as a new target value into the second register T (step S6). Whereupon, the CPU supplies a control signal corresponding to the value tn stored in the second register to the brake 12, thus completing the updating process (step S7).

Figure 4:
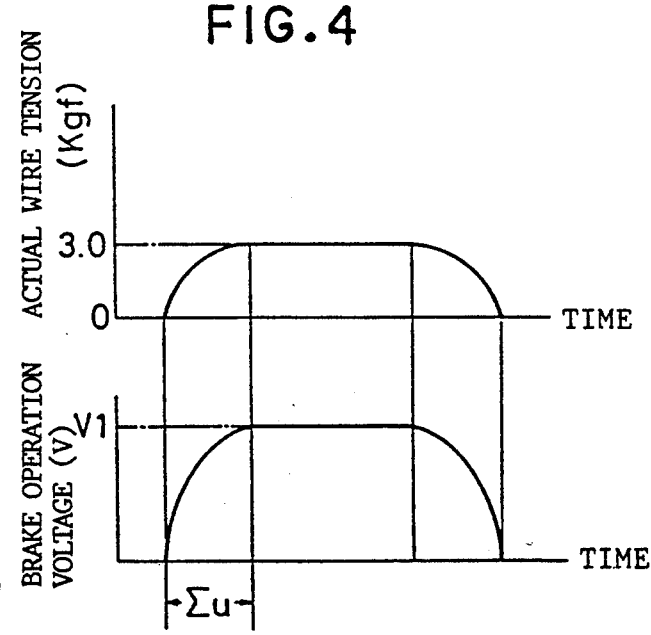
FIG. 4 is a graph similar to FIG. 3 and associated with the wire tension setting/updating process of FIG. 2.

As a result, as shown in the left half portion of FIG. 4, the operation voltage of the electromagnetic powder brake 12 gradually increases from a value 0 obtained at the start the updating process to the value v1 obtained at the completion of the same process. At this time, the actual wire tension gradually increase from the value 0.0 kgf obtained before the updating operation to the instructed wire tension 3.0 kgf during the updating processing period ΣU (for example, 1 to 3 sec.). Therefore, the wire will not vibrate and the brake 12 will not be locked so that the wire will not be broken.

On the other hand, when it is determined in the step S2 of the processing cycle, corresponding to the time point at which the updating process starts, that the absolute value of the difference between the instructed wire tension tn the present target wire tension t0 is larger than the upper limit value Δt, and further it is determined in the step S3 that the value tn is not larger than the value t0, that is, when it is determined that there is a possibility that the actual wire tension may be excessively reduced if the new instructed value is immediately used as the new target value, the CPU sets a value, derived by subtracting the upper limit value Δt from the present target wire tension t0, into the second register as a new target value (step S8). Whereupon, the step S2 is entered after execution of the step S5. Thereafter, a series of operations including the steps S2, S3, S8 and S5 are repeatedly effected until the target wire tension reaches the instructed value. As a result, the operation voltage of the powder brake 12 and the actual wire tension gradually decrease as shown in the right half portion of FIG. 4. Therefore, no wire vibration occurs, and a rapid release operation of the brake 12 and resulatant slackness of the wire 3 do not occur. Thus, an erroneous determination in the breakage detection operation by the breakage detection apparatus 5 will not occur.

When it is determined in the step S2 of the processing cycle, corresponding to the time point at which the updating process starts, that the absolute value of the difference between the instructed wire tension tn and the present target wire tension t0 is not larger than the upper limit variation rate Δt, an excessive variation in the actual wire tension and problems caused thereby do not occur even if the instructed wire tension tn is immediately used as a new target wire tension. Thus, the aforesaid steps S6, S7 are executed, thereby completing the updating process.

The present invention is not limited to the above embodiment and various modification may be made. For example, it is not inevitably necessary to linearly update the target wire tension in the wire tension setting/updating processing of FIG. 2, and it is possible to non-linearly update same. Further, it is possible to provide, between the steps S5 and S2 in the setting/updating process, a step of delaying the updating operation of the target wire tension by an appropriate time period. In this case, for example, a timer in which the delay time is set is started at the end of the step S5, and then the CPU is set in a stand-by mode until the timer is up.

What is claimed is:

1. A wire tension controlling method in a wire cut electric discharge machine adapted to control a wire tension applied to a wire electrode by means of an electric brake, said method comprising steps of:
   (a) determining, when a wire tension setting/updating instruction is delivered, whether an actual wire tension would exceed a predetermined range, if said electric brake is operated in accordance with said instruction;
   (b) changing a target wire tension by a predetermined amount, when it is determined in step (a) that the actual tension will exceed the predetermined range; and
   (c) periodically effecting said step (b) until said target wire tension reaches an instructed wire tension specified by said instruction.

2. A wire tension controlling method in a wire cut electric discharge machine according to claim 1, wherein the determination of the actual tension exceeding the predetermined range occurs when it is determined, on the basis of a present instructed wire tension and a new instructed wire tension, that a variation rate of said instructed wire tension is larger than a predetermined variation rate corresponding to said predetermined amount used in said step (b).

3. A wire tension controlling method in a wire cut electric discharge machine according to claim 1, wherein said instructed wire intension is immediately set as a new target wire tension when it is determined in said step (a) that said actual wire tension would exceed the predetermined range.

4. A wire tension controlling method in a wire cut electric discharge machine according to claim 1, wherein said electric discharge machine includes a brake roller arranged in contact with said wire electrode and connected to said electric brake, and a control unit connected to said electric brake; and wherein said method further comprises the step of controlling a brake force applied from said electric brake to said brake roller in accordance with said target wire tension obtained in said step (b), thereby controlling said actual wire tension to said target wire tension.

5. A wire tension controlling method in a wire cut electric discharge machine according to claim 4, wherein said electric brake is comprised of an electromagnetic powder brake operable to generate a braking force which varies depending upon any one of operating power, operating voltage and operating current.

6. A wire tension controlling method in a wire cut electric discharge machine according to claim 1, wherein said predetermined amount used in said step (b) is set to such a value as to prevent occurrence of an excessive variation in said actual wire tension which may cause wire breakage.

7. A wire tension controlling method in a wire cut electric discharge machine according to claim 1,
wherein said electric discharge machine includes a breakage detection apparatus; and
wherein said predetermined amount used in said step (b) is set to such a value as to prevent occurrence of an excessive variation in said actual wire tension which may cause an erroneous determination in a breakage detection operation of said breakage detection apparatus.

8. A wire tension controlling method in a wire cut electric discharge machine according to claim 1,
wherein said electric discharge machine includes an operating section; and
wherein said predetermined amount used in said step (b) is set to such a value as to prevent occurrence of an excessive variation in said actual wire tension which may cause wire vibration, badly influencing said operating section.

* * * * *